United States Patent Office 3,492,168
Patented Jan. 27, 1970

3,492,168
REVERSIBLE ELECTROLYTIC CELLS
John J. Root, New York, N.Y., assignor to Molecular Energy Corporation, Farmingdale, N.Y., a corporation of New York
No Drawing. Filed Mar. 27, 1967, Ser. No. 625,954
Int. Cl. H01m 9/04, 11/00
U.S. Cl. 136—153           10 Claims

ABSTRACT OF THE DISCLOSURE

An electrolytic cell having two electrodes with a solid depolarizer-electrolyte material therebetween. The solid material is composed of metallic halide salts, one of the salts being a platable metallic halide, and has elemental iodine or bromine therein. The solid material being formed by the addition of the salts to an aqueous solution until a solid hydrogel is formed.

BACKGROUND OF THE INVENTION

The invention relates to rechargeable batteries. In normal battery operation, it is difficult to employ in currently used systems a solid state electrolyte since it is necessary to keep the electrolyte in close contact with the electrode to be oxidized. Therefore, it is required that the electrolyte enter into the pores of the oxidizable substance in order to be able to obtain a charge or a discharge. In the system of this invention, the electrolyte becomes the oxidant and the reducer. The electrolyte due to its crystalline solid state establishes its own variable electrolytic boundary keeping the oxidant and the reducer separated.

SUMMARY

In accordance with this invention, a reversible electrolytic cell is provided with a hydrogel which is maintained in substantially a solid state and in operation does not generate gases. Accordingly, one or a plurality of these cells may be hermetically sealed.

Each cell comprises two electrodes and a hydrogel between the electrodes. The hydrogel comprises a water soluble platable halide of a metal above hydrogen in the electromotive force series of elements. The hydrogel also contains bromine or iodine which is added in its elemental state. Alternatively, the bromine or iodine may be produced within the cell by the utilization of crystallizing halides or bromides but which do not necessarily have to be platable salts. Regardless of how the cell is produced, it contains some elemental bromine or iodine. That elemental bromine or iodine made during any stage of the process is converted into combination halide ions such as the $I_3$ ion.

The cell of this invention may be produced my forming a hydrogel from a halide which is also a salt of a platable metal, such as zinc iodide or cadmium bromide, in combination with the elemental iodine or bromine. Desirably, a super saturated solution of the halide and iodine or bromine is employed. Alternatively, the iodine or bromine may be produced by the addition in the formation of the hydrogel of a water soluble iodide or bromide, such as lithium bromide or barium iodide. Advantageously, a water soluble salt may be also added which would furnish an electrolyte, such as sodium chloride. In accordance with this invention, the bromine or iodine furnishes the oxidant, the platable metal salt furnishes the reductant and the desirable added neutral salt furnishes constantly functioning electrolyte. The electrolyte also furnishes a depot for the sorption of water released in the operation of the cell.

In order to prevent the formation of large crystals in the hydrogel, a finely divided inert solid is desirably added which prevents the formation of such large crystals. For this purpose finely divided titanium oxide, barium sulfate, calcium fluoride or other alkaline earth metal fluorides, silicic acid or zinc fluoride may be used. For certain installations, the hydrogel may be modified to vary the pH by the addition of buffer salts, such as sodium sulfate or calcium phosphate, or an acid, such as hydrochloric acid, or a base, such as potassium hydroxide. A heavy alcohol, such as ethylene glycol or glycerine may be incorporated to give greater flexibility to the hydrogel. A catalyst such as platinum black, a chromate salt of potassium, sulfur, chromium trioxide or vanadium pentoxide may be added to accelerate the reaction between hydrogen and halogen. Although the electrolytic cells of this invention do not customarily generate any surplus gases, any hydrogen that is generated would combine with the halogen present to produce a non-gaseous compound. The compound produced simply becomes part of the electrolyte. The internal pressure of the sealed cell of this invention does not exceed that of the halogen present.

The electrodes of this invention may be inert, non-dissolvable electrodes, such as graphite or platinum. However, the electropositive electrode may and preferably is for many installations, a dissolvable metal such as zinc, cadmium, iron or tin. Examples of halide of platable metals above hydrogen in the electromotive force series of elements are zinc, tin, cadmium, thallium or iron. The ampere-hour capacity of the cells is determined by the Maxwell's Laws of Electrolysis. A potential of the electropositive and electronegative elements in the hydrogen is determined according to the position in the electromotive force series of elements. Due to the inherent neutrality of the cell and the polarity reversability, the cell may be used as a memory component of a computer.

Since cells of this invention can assume variable polarities depending upon the direction of the charge, one or a plurality of such cells can be used as memory components in computers. Moreover, by using a plurality of inert electrodes in series in the hydrogel, there can be obtained a multiple of a potential of one cell by the number of electrodes less one. Alternatively, the same result may be achieved by plating electrode segments periodically along an insulated surface, such as glass, and spraying the hydrogel on the insulated surface. Again, there can be dispersed large particles of a conducting material, such as graphite, in the hydrogel in combination with two end electrodes. If a direct charging current is applied to the two end electrodes, a series of cells is set up in series between the two end electrodes. Between each pair of conducting particles, such as graphite, there is set up a cell in which one of the particles acts as an electropositive electrode and the other as an electronegative electrode. But each of the electropositive electrodes also acts as an electronegative electrode with respect to another particle. Consequently, there is obtained an extremely high potential as a result of this plurality of co-adjacent electrolyzed particles. This result could not be achieved with a wet electrolyte.

DESCRIPTION OF PREFERRED EMBODIMENTS

Example I

Six grams of zinc iodide were added to a saturated aqueous solution of sodium chloride. It was found that it required 20 grams of the saturated solution of sodium chloride to dissolve the 6 grams of zinc iodide and to form a saturated solution of that halide. Iodine was then added to the resulting combination solution. It was found that it required about 6 grams of iodine ($I_2$) to completely saturate the resulting combination solution with iodine. Two grams of lithium chloride were then added to the resulting solution. Sodium chloride crystals were then slowly and gradually added to the resulting solution until gelation took place. Two carbon electrodes were then placed in the solution just prior to gelation. After about thirty minutes, the gel set. At that point, the potentials measured and indicated 0 volt.

After charging at a potential of three volts, at 0.3 ampere, for an hour, one electrode had zinc plated thereon, while the other electrode had an accumulation of iodine surrounding it. On measuring the potential, it was found to be 2.0 volt. It had a short circuiting current of 0.5 ampere. The area of the electrodes were about one-half inch. The cell was discharged through a resistive load for three quarters of an hour at 0.250 milliampere at a potential of 1.5 volts.

Example II

Example I was repeated except that after the iodine was added and before the lithium chloride was added, 4.0 grams of zinc chloride were added to the saturated solution of sodium chloride with the zinc iodide and elemental iodine. The same quantity of lithium chloride and sodium chloride were added as described in Example I. The same kind, type and size of carbon electrodes were then inserted in the combination solution just before gelation of the hydrogel. After one half hour from the gelation, the potential was taken and found to be 0 volt. A charge was then placed on across the electrodes after five minutes. The potential was 2.2 volts. The short circuiting current was 0.55 ampere. The battery was charged for two hours at 0.3 ampere. This battery was discharged for two hours at 0.250 milliampere at a potential of 1.5 volts. During the charging, a separation was observed between the electrodes. A light white boundary line was clearly shown. On discharge, the boundary line diminished.

Example III

Example I was repeated except that after the solution of sodium chloride has been added 5 grams of potassium iodide was added to the combined solution. In order to obtain the solution of the potassium iodide, it was necessary to add 7 grams of a saturated solution of sodium chloride. The resulting solution also took an additional 4 grams of iodine to effect saturation of the resulting solution with iodine. The lithium chloride was then added as in Example I. Salt crystals were added for gelation. The inert carbon electrodes were inserted in the combined solution just prior to gelation.

After the combined gel was permitted to stand for one half hour after the initial gelation, it was subjected to a charging current. The potential at that point was 0 volt. After a five minute charge, the potential was 1.35 volts. After a charge of about one hour, the potential was between 1.7 and 1.9 volts. It had a short circuiting potential of 0.3 ampere. In discharging, the battery lasted about one half hour at 150 milliamperes at 1.5 volts.

In order to retard the gel from setting too hard and for tightening up the latice crystalline structure, an alternating current of about 4 volts is applied to the cell. Such alternating current is applied to the mixture substantially immediately after the super saturated solution is prepared and is about to gel. The alternating current permits the gel to set with larger latice spaces in its crystalline structure. The alternating current is applied before gelation and up to the time that it has completely gelled. Thereafter, the battery may be charged and discharged in a normal manner. This method decreases the internal resistance of the cell. On charging, this cell had a potential of 3 volts and an open circuit potential of its own of 2.2 volts. It had a short circuiting current of 0.7 ampere.

Reversible electrolytic cells containing bromine may be produced in the same manner as those containing iodine and described in Examples I, II and III. Instead of employing zinc iodide and iodine in Example I, for instance, zinc bromide and liquid bromine are used. The saturated sodium chloride, the lithium chloride and sodium chloride crystals may be employed with the bromine as with the iodine.

I claim:

1. A reversible electrolytic cell comprising two electrodes and a solid hydrogel therebetween, said hydrogel comprising a water soluble platable halide of a metal above hydrogen in the electromotive force series of elements, at least two alkali metal halide salts and elemental iodine or bromine.

2. A reversible electrolytic cell in accordance with claim 1 in which said bromine or iodine is produced by a water soluble bromide or iodide salt contained in said hydrogel.

3. A reversible electrolytic cell in accordance with claim 1 in which there is distributed in said hydrogel a finely divided inert solid, said solid being selected from the group consisting of titanium oxide, barium sulfate, zinc fluoride, silicic acid, an alkaline earth metal fluoride or any combination of them which prevents the formation of large crystals in said hydrogel.

4. A reversible electrolytic cell in accordance with claim 1 in which the platable metallic halide is a zinc halide.

5. A reversible electrolytic cell in accordance with claim 1 in which the iodine or bromine is generated with an alkaline metal iodide or bromide.

6. A reversible electrolytic cell in accordance with claim 1 in which said platable metallic halide is a zinc halide and said hydrogel also contains an alkali metal chloride.

7. A reversible electrolytic cell in accordance with claim 1 in which sufficient acid or base is contained in the hydrogel to maintain an acidic or basic condition throughout the charging cycle.

8. A reversible cell in accordance with claim 1 in which the electrodes are inert, non-dissolvable electrodes whereby the electrodes will assume a polarity established by the direction of the charge.

9. A reversible cell in accordance with claim 1 in which a catalyst is included to accelerate the reaction between hydrogen and halogen in the operation of the cell.

10. A reversible cell in accordance with claim 9 in which the catalyst is platinum black, a chromate salt of potassium, sulfur, chromium trioxide or vanadium pentoxide.

References Cited

UNITED STATES PATENTS

| 2,588,170 | 3/1952  | Smith _____ 136—6     |
| 3,057,760 | 10/1962 | Dereska et al. _____ 136—137  |
| 3,208,879 | 9/1965  | McGinnis et al. _____ 136—6   |
| 3,346,423 | 10/1967 | Smyth et al. _____ 136—83 XR   |
| 3,373,058 | 3/1968  | Bloch _____ 136—83    |
| 2,696,513 | 12/1954 | Lehovec _____ 136—153 XR    |

WINSTON A. DOUGLAS, Primary Examiner

D. L. WALTON, Assistant Examiner

U.S. Cl. X.R.

136—83, 157